US008004726B2

(12) United States Patent　　(10) Patent No.: US 8,004,726 B2
Misaka　　(45) Date of Patent: Aug. 23, 2011

(54) IMAGE READING APPARATUS AND IMAGE DENSITY CORRECTION METHOD

(75) Inventor: Naoyuki Misaka, Sunto-gun (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1236 days.

(21) Appl. No.: 11/670,699

(22) Filed: Feb. 2, 2007

(65) Prior Publication Data

US 2008/0187250 A1　　Aug. 7, 2008

(51) Int. Cl.
*H04N 1/04*　　(2006.01)
*H04N 1/40*　　(2006.01)
*H04N 1/36*　　(2006.01)
*H04N 1/46*　　(2006.01)
*G06K 9/40*　　(2006.01)
*G06K 9/00*　　(2006.01)

(52) U.S. Cl. ........ 358/474; 358/471; 358/472; 358/500; 358/461; 358/420; 382/312; 382/274; 382/167; 382/275

(58) Field of Classification Search .................. 358/474, 358/475, 471, 472, 461; 382/312, 274, 167, 382/275
See application file for complete search history.

(56) References Cited

U.S. PATENT DOCUMENTS

| | | | | |
|---|---|---|---|---|
| 5,264,948 A * | 11/1993 | Imoto | ............................ | 358/474 |
| 5,325,210 A * | 6/1994 | Takashima et al. | ........... | 358/461 |
| 5,880,859 A * | 3/1999 | Hiromatsu | ..................... | 358/514 |
| 6,741,373 B1 * | 5/2004 | Chizawa | ........................ | 358/475 |
| 6,771,397 B2 * | 8/2004 | Hashizume | .................... | 358/474 |
| 6,801,670 B2 * | 10/2004 | Kijima et al. | ................. | 382/274 |
| 7,236,270 B2 * | 6/2007 | Okamura | ...................... | 358/406 |
| 7,272,266 B2 * | 9/2007 | Kuo et al. | ..................... | 382/274 |
| 7,453,607 B2 * | 11/2008 | Hiromatsu | .................... | 358/474 |
| 7,489,426 B2 * | 2/2009 | Hashizume | .................... | 358/514 |
| 7,777,918 B2 * | 8/2010 | Sekizawa et al. | ............. | 358/3.26 |
| 2001/0043372 A1 * | 11/2001 | Suzuki et al. | ................. | 358/474 |
| 2002/0003908 A1 * | 1/2002 | Kijima et al. | ................. | 382/274 |
| 2003/0002735 A1 * | 1/2003 | Yamamoto et al. | ........... | 382/167 |
| 2003/0081269 A1 * | 5/2003 | Aoyama et al. | ............... | 358/474 |
| 2003/0128889 A1 * | 7/2003 | Maeda et al. | ................. | 382/275 |
| 2004/0057087 A1 * | 3/2004 | Wada | ............................ | 358/497 |
| 2004/0174575 A1 * | 9/2004 | Ide et al. | ....................... | 358/505 |
| 2005/0206977 A1 * | 9/2005 | Hashizume | .................... | 358/512 |

FOREIGN PATENT DOCUMENTS

| | | |
|---|---|---|
| JP | 2001-045288 | 2/2001 |
| JP | 2002-300392 | 10/2002 |

* cited by examiner

*Primary Examiner* — Chan S Park
*Assistant Examiner* — Hilina S Kassa
(74) *Attorney, Agent, or Firm* — Turocy & Watson, LLP

(57) ABSTRACT

A technique that can realize acquisition of a proper white reference value in shading correction is provided.
It includes plural line sensors arranged at different positions from each other in a sub-scanning direction and configured to read reflected light from a reading target surface, guided by a scanning optical system that moves in the sub-scanning direction, and a reading control unit configured to control image reading timing in each line sensor so that, when reading a predetermined white reference board by the plural line sensors in order to perform shading correction, the plural line sensors have substantially the same reading area on the white reference board.

17 Claims, 16 Drawing Sheets

PRIOR ART

IMAGE READING APPARATUS AND IMAGE DENSITY CORRECTION METHOD

BACKGROUND OF THE INVENTION

1. Field of the Invention

The present invention relates to shading correction in an image reading apparatus, and particularly to a technique for realizing acquisition of a proper white reference value in shading correction.

2. Description of the Related Art

Traditionally, in the processing to read a white reference board when performing shading correction in an image reading apparatus, several lines are read by a line sensor and the average value of these is used as a white reference value.

Also a technique of finding a white reference value by reading white reference data of several lines by a line sensor and then statistically processing the data, instead of simply averaging the data, is known (see JP-A-11-289432).

The traditional techniques are carried out to reduce the influence of foreign matter adhering to the white reference board in the case of performing shading correction in the image reading apparatus.

In the method using an average value of white reference data or the method using statistical processing as in the traditional techniques, in the case where detection, removal and correction of foreign matter on the white reference board is carried out, it is possible to find a white reference value with less adverse effects if the foreign matter adhering to the white reference board is reasonably small.

However, if the foreign matter adhering to the white reference board is too large to correct sufficiently, it affects the white reference value even when the processing as in the traditional techniques is carried out.

SUMMARY OF THE INVENTION

An object of an aspect of the invention is to provide a technique that can realize acquisition of a proper white reference value in shading correction.

To overcome the above problem, an image reading apparatus according to an aspect of the invention includes: plural line sensors arranged at different positions from each other in a sub-scanning direction and configured to read reflected light from a reading target surface, guided by a scanning optical system that moves in the sub-scanning direction; and a reading control unit configured to control image reading timing in each line sensor so that, when reading a predetermined white reference board by the plural line sensors in order to perform shading correction, the plural line sensors have substantially the same reading area on the white reference board.

Also, an image reading apparatus according to an aspect of the invention includes: plural image reading means arranged at different positions from each other in a sub-scanning direction and for reading reflected light from a reading target surface, guided by a scanning optical system that moves in the sub-scanning direction; and reading control means for controlling reading timing in each image reading means so that, when reading a predetermined white reference board by the plural image reading means in order to perform shading correction, the plural image reading means have substantially the same reading area on the white reference board.

Moreover, an image density correction method according to an aspect of the invention is for an image reading apparatus that has plural line sensors arranged at different positions from each other in a sub-scanning direction and configured to read reflected light from a reading target surface, guided by a scanning optical system that moves in the sub-scanning direction. The method includes the steps of: controlling image reading timing in each line sensor so that, when reading a predetermined white reference board by the plural line sensors in order to perform shading correction, the plural line sensors have substantially the same reading area on the white reference board; and executing shading correction based on information acquired as a result of reading the white reference board by the plural line sensors, in accordance with the control of the image reading timing.

DESCRIPTION OF THE EMBODIMENTS

Hereinafter, embodiments of the invention will be described with reference to the drawings.

First Embodiment

A first embodiment of the invention will now be described.

It is assumed that an image reading apparatus M according to the embodiment is, for example, a multi function peripheral (MFP).

Figure 1:
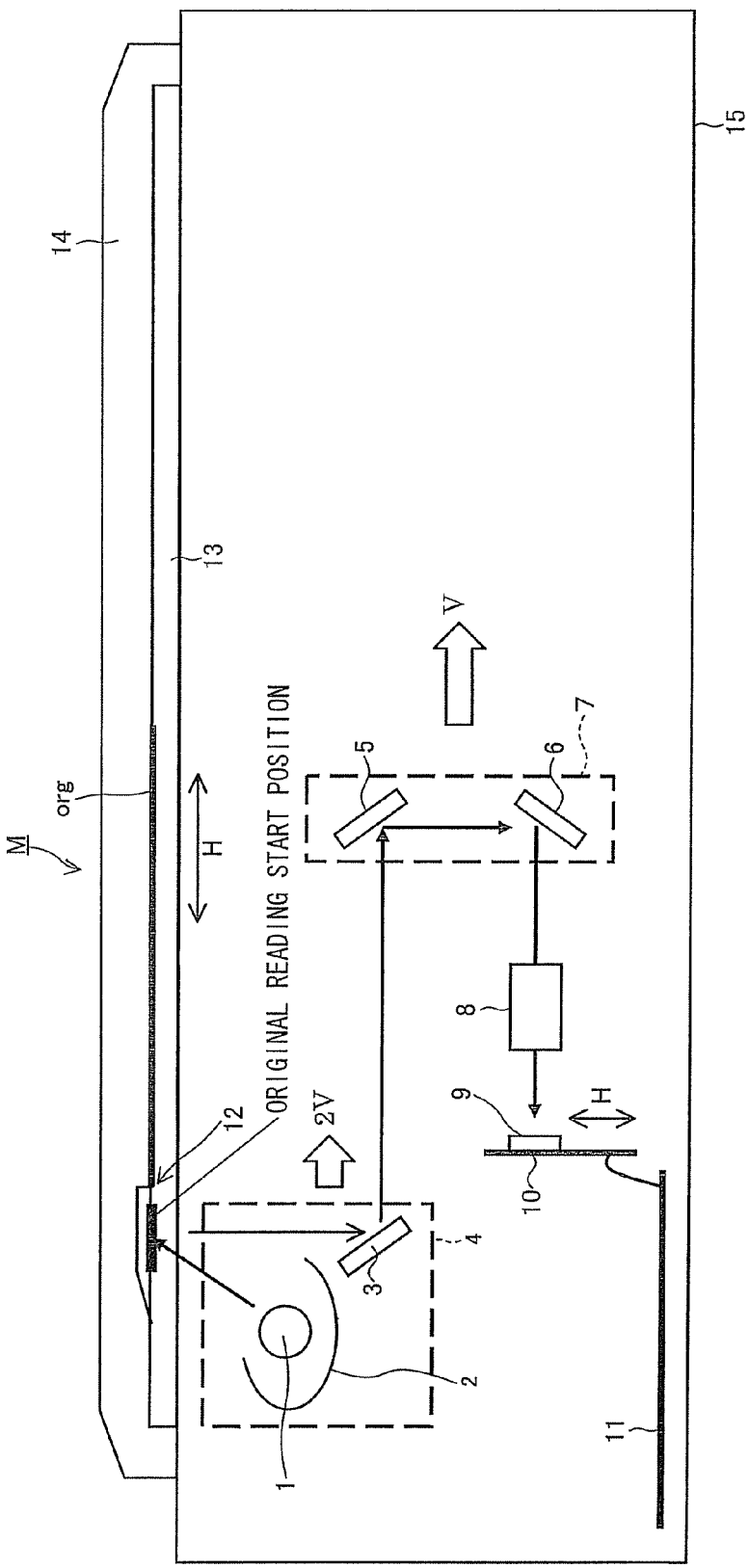
FIG. 1 is a schematic configuration view for explaining the schematic configuration of an image reading apparatus M according to a first embodiment of the invention.

FIG. 1 is a schematic configuration view for explaining the schematic configuration of the image reading apparatus M according to the first embodiment of the invention.

The image reading apparatus M according to the embodiment has a light source 1, a reflector 2 that corrects the luminous intensity distribution of the light source 1, a first mirror 3, a second mirror 5, a third mirror 6, a condensing lens 8, a CCD line sensor 9, a control board 11 that controls the CCD line sensor 9 and carries out various processing, a white reference board 12 to provide a white reference, an original glass 13 for setting an original org thereon, an original holding cover 14 for fixing the original org so that it will not float, and a scanner casing 15 for arranging all the above components therein.

The light source 1, the reflector 2 and the first mirror 3 form a first carriage 4. The second mirror 5 and the third mirror 6 form a second carriage 7. Also, the CCD line sensor 9 is mounted on a CCD sensor board 10. The first carriage 4, the second carriage 7 and the condensing lens 8 form a scanning optical system. In this scanning optical system, the first carriage 4 and the second carriage 7 are movable in a sub-scanning direction (H direction that is in the horizontal direction in FIG. 1). The first carriage 4 is to move at a moving speed (2V) that is twice the moving speed (V) of the second carriage 7.

First, an outline of the operation of the image reading apparatus M according to the embodiment will be described with reference FIG. 1.

Light cast from the light source 1 is transmitted through the original glass 13 and cast onto the original org. Here, the luminous intensity distribution of the light cast from the light source 1 is not even, and uneven luminous intensity distribution occurs in the illumination on the original org. Therefore, also the reflected light from the reflector 2 is cast onto the original org, thereby realizing even luminous intensity distribution on the original org.

The reflected light from the original org is reflected by the first mirror 3, the second mirror 5 and the third mirror 6, is then passed through the condensing lens 8, and forms an image on a light receiving surface of the CCD line sensor 9. The CCD line sensor 9 is mounted on the CCD sensor board 10 and is controlled by a control signal inputted from the control board 11. The control board 11 will be later described in detail.

The original holding cover is to hold the reading surface of the original org set on the original glass 13 so that it is closely in contact with the original glass 13.

The configuration of the CCD line sensor 9 will be later described in detail. An analog signal outputted from the CCD line sensor 9 includes a high-frequency distortion due to the difference in conversion efficiency between the respective photoelectric conversion units, and a low-frequency distortion caused by aberration due to the face that it is a reducing optical system using the condensing lens 8. Therefore, data to serve as a reference is necessary for carrying out normalization correction. In the configuration shown in FIG. 1, the reference data is image data acquired when reading the white reference board 12.

Figure 2:
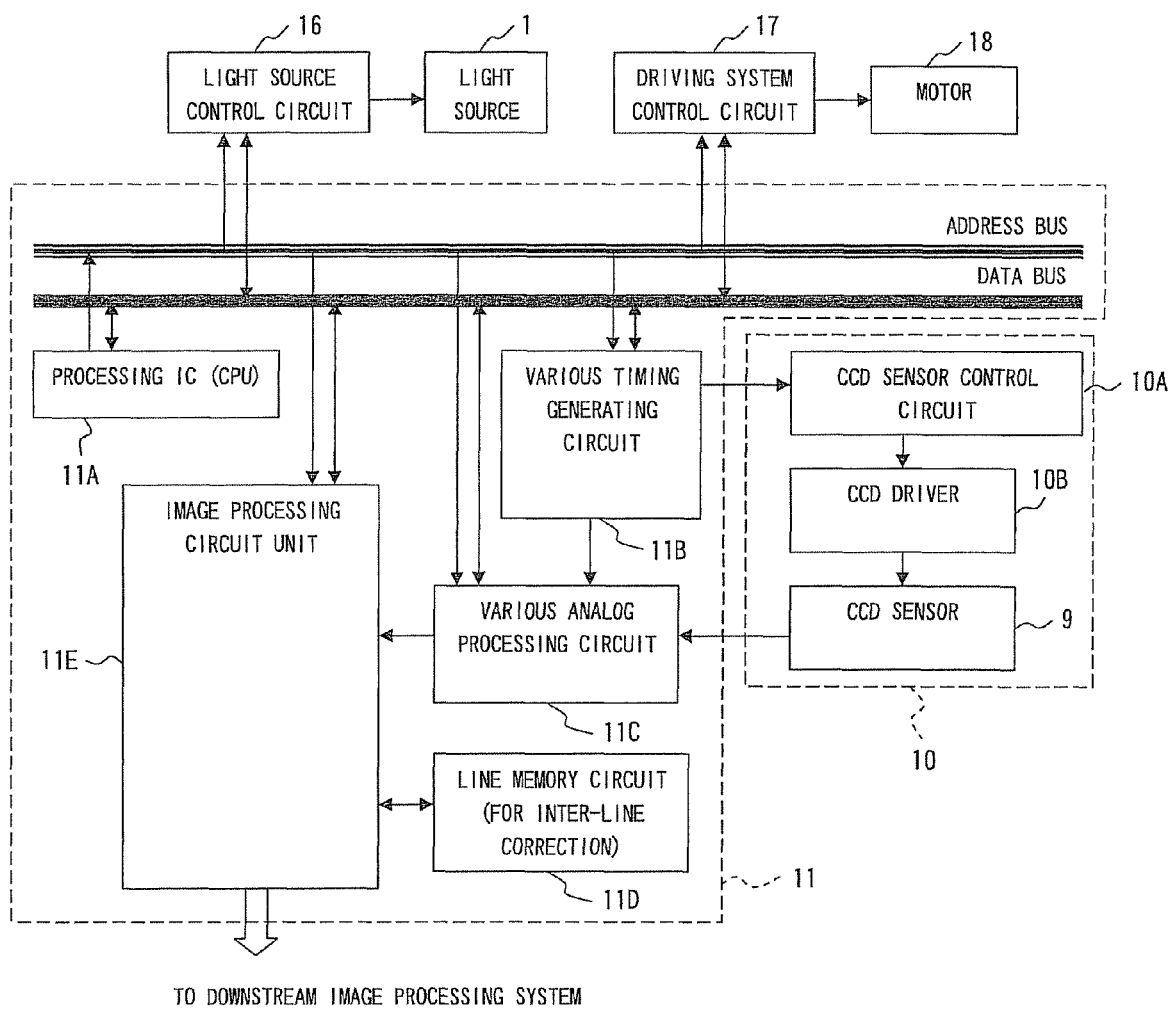
FIG. 2 is a view for explaining the configuration of a control board 11.

Next, the configuration of the control board 11 will be described in detail. FIG. 2 is a view for explaining the configuration of the control board 11.

The control board 11 includes a processing IC 11A that performs various processing, a various timing generating circuit 11B that generates various timing, a various analog processing circuit 11C that processes the analog signal from the CCD line sensor 9 and performs processing up to conversion of the analog signal to a digital signal, an image processing circuit unit 11E that performs image corrections such as shading correction to correct the high-frequency and low-frequency distortions and inter-line correction processing to correct a line position deviation between plural line sensors with respect to the digital signal outputted from the various analog processing circuit 11C, and a line memory circuit 11D for delaying image data by line when performing inter-line correction processing.

This processing IC 11A also controls a CCD sensor control circuit 10A mounted on the CCD sensor board 10, a light source control circuit 16 that performs light emission control of the light source 1, and a driving system control circuit 17 that controls a motor 18 for driving the first carriage 4 and the second carriage 7.

The CCD sensor board 10 includes the CCD line sensor 9, the CCD sensor control circuit 10A for driving the CCD line sensor 9, and a CCD driver 10B that receives an output of the CCD sensor control circuit 10A and adjusts it to the driving condition of the CCD line sensor 9.

Figure 3:
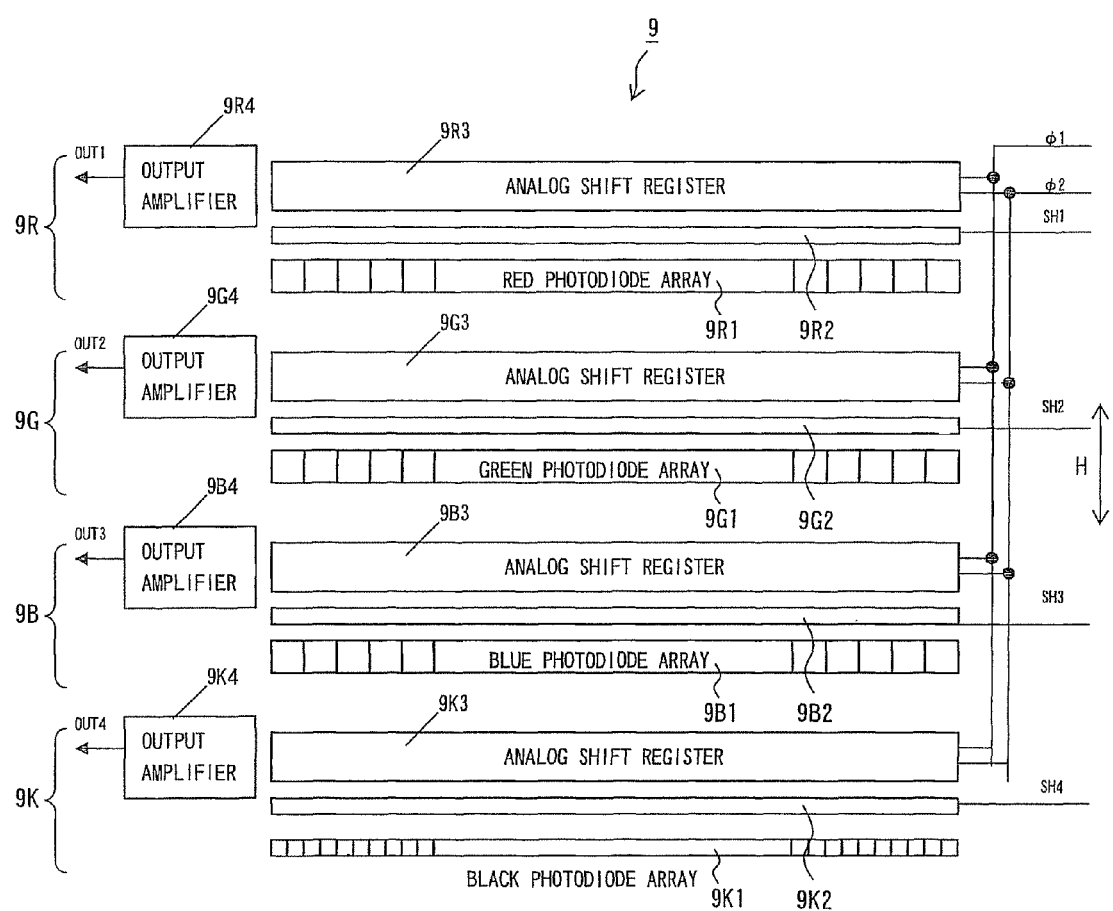
FIG. 3 is a schematic configuration view of a CCD line sensor 9 in the image reading apparatus M according to the first embodiment of the invention.

FIG. 3 is a schematic configuration view of the CCD line sensor 9 in the image reading apparatus M according to the first embodiment of the invention. The CCD line sensor 9 includes four line sensors, that is, a red line sensor 9R, a green line sensor 9G, a blue line sensor 9B, and a black line sensor 9K.

These four line sensors are arranged at difference positions from each other in the sub-scanning direction (H direction that is in the vertical direction in FIG. 1, corresponding to the sub-scanning direction in which the scanning optical system moves). As shown in FIG. 3, each line sensor includes a photodiode array, a shift gate, an analog shift register, and an output amplifier.

First, in the red line sensor 9R, light is converted to the quantity of electric charges corresponding to the quantity of incident light by photoelectric conversion in a red photodiode array 9R1 having a red color filter, not shown, arranged on its light receiving surface, and the charges are accumulated in each photodiode. The accumulated charges pass through a shift gate 9R2 in accordance with a control signal SH1 applied to the shift gate 9R2, and are transferred to an analog shift register 9R3. The charges transferred to the analog shift register 9R3 sequentially move toward a downstream output amplifier 9R4 in accordance with control signals φ1 and φ2, and are outputted outward from the output amplifier 9R4. The output signal at this point is referred to as OUT1.

In the green line sensor 9G, light is similarly converted to the quantity of electric charges corresponding to the quantity of incident light by photoelectric conversion in a green photodiode array 9G1 having a green color filter, not shown, arranged on its light receiving surface, and the charges are accumulated in each photodiode. The accumulated charges pass through a shift gate 9G2 in accordance with a control signal SH2 applied to the shift gate 9G2, and are transferred to an analog shift register 9G3. The charges transferred to the analog shift register 9G3 sequentially move toward a downstream output amplifier 9G4 in accordance with control signals φ1 and φ2, and are outputted outward from the output amplifier 9G4. The output signal at this point is referred to as OUT2.

Similarly, in the blue line sensor 9B, light is converted to the quantity of electric charges corresponding to the quantity of incident light by photoelectric conversion in a blue photodiode array 9B1 having a blue color filter, not shown, arranged on its light receiving surface, and the charges are accumulated in each photodiode. The accumulated charges pass through a shift gate 9B2 in accordance with a control signal SH3 applied to the shift gate 9B2, and are transferred to an analog shift register 9B3. The charges transferred to the analog shift register 9B3 sequentially move toward a downstream output amplifier 9B4 in accordance with control signals φ1 and φ2, and are outputted outward from the output amplifier 9B4. The output signal at this point is referred to as OUT3.

Similarly, in the black line sensor 9K, light is converted to the quantity of electric charges corresponding to the quantity of incident light by photoelectric conversion in a black photodiode array 9K1 having no color filter arranged on its light receiving surface, and the charges are accumulated in each photodiode. The accumulated charges pass through a shift gate 9K2 in accordance with a control signal SH4 applied to the shift gate 9K2, and are transferred to an analog shift register 9K3. The charges transferred to the analog shift register 9K3 sequentially move toward a downstream output amplifier 9K4 in accordance with control signals φ1 and φ2, and are outputted outward from the output amplifier 9K4. The output signal at this point is referred to as OUT4.

Figure 4:
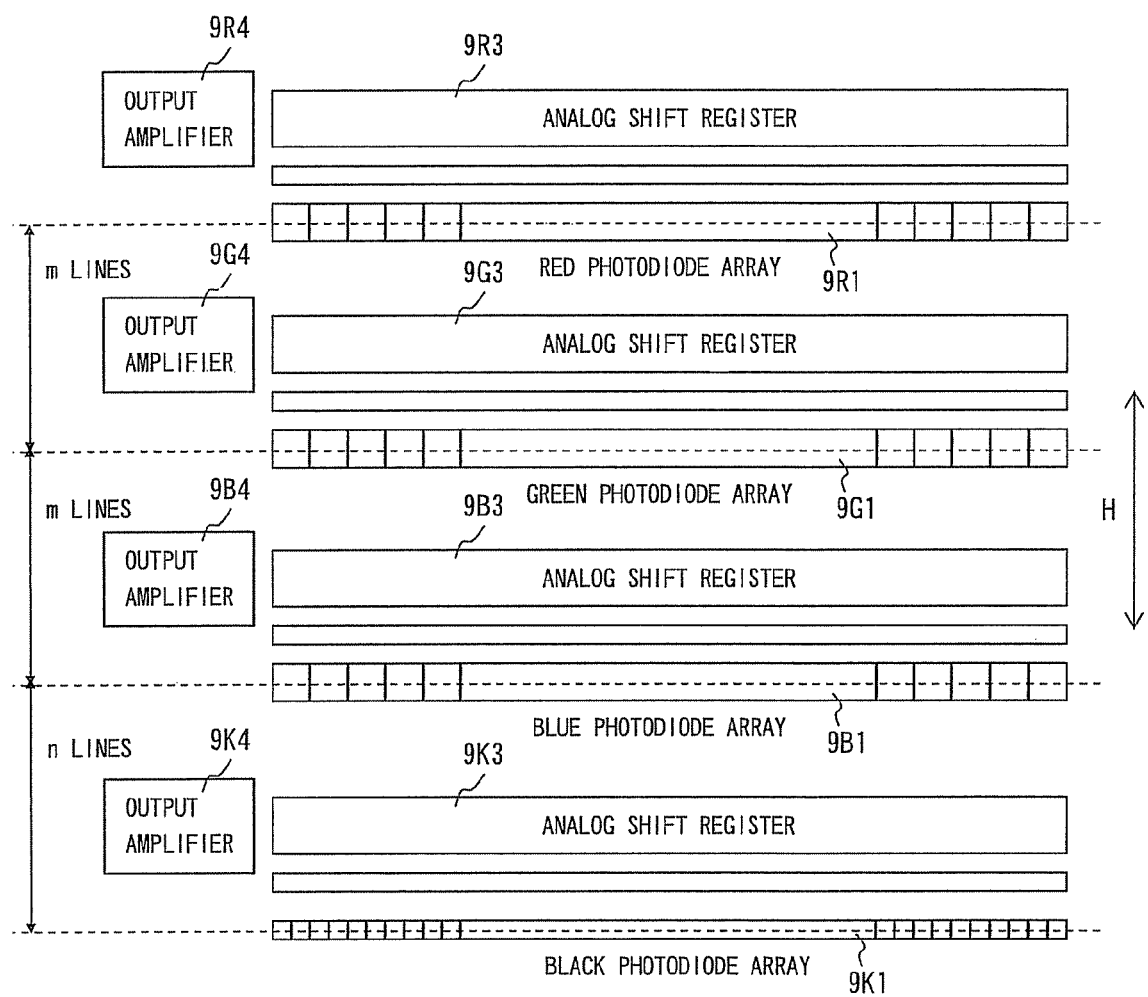
FIG. 4 is a view for explaining the layout of each photodiode array, shift gate, analog shift register, and output amplifier.

FIG. 4 is a view for explaining the layout of each of the photodiode arrays, the shift gate, the analog shift register, and the output amplifier.

As the distance between the respective photodiode arrays (the distance in the sub-scanning direction), the distance between the red photodiode array 9R1 and the green photodiode array 9G1 and the distance between the green photodiode array 9G1 and the blue photodiode array 9B1 are m lines, respectively. The distance between the blue photodiode array 9B1 and the black photodiode array 9K1 is n lines.

Here, the size (hereinafter referred to as pixel size) of the red photodiode array 9R1, the green photodiode array 9G1 and the blue photodiode array 9B1 is set to be larger than the pixel size of the black photodiode array 9B1. That is, the number of pixels in the red photodiode array 9R1, the green photodiode array 9G1 and the blue photodiode array 9B1 is smaller than the number of pixels in the black photodiode array 9K1.

Figure 5:
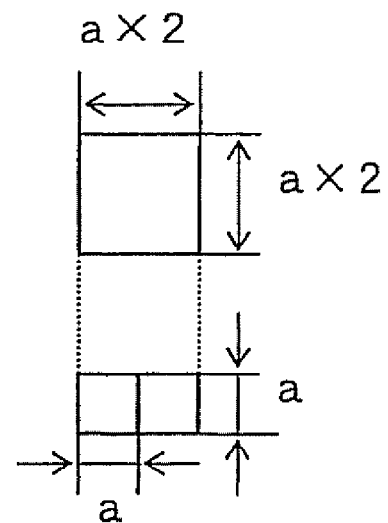
FIG. 5 is a view for explaining the pixel size of a photodiode array in the CCD line sensor in the embodiment.

FIG. 5 is a view for explaining the pixel sizes of the photodiode arrays in the CCD line sensor in the embodiment.

In the embodiment, if it is assumed that the pixel size in the black photodiode array 9K1 is a×a and that the pixel size in each of the red photodiode array 9R1, the green photodiode array 9G1 and the blue photodiode array 9B1 is (a×2)×(a×2), as shown in FIG. 5, the number of pixels in each of the red photodiode array 9R1, the green photodiode array 9G1 and the blue photodiode array 9B1 is half the number of pixels in the black photodiode array 9K1 because the length in the longitudinal direction is the same in all the photodiode arrays.

In the case of reading the length of 297 mm, which is in the longitudinal direction of A4 size, by the black photodiode array 9K1 with a resolution of 600 dpi, it results in 600(dpi)/25.4(mm)×297(mm)=7015.7. At least the number of pixels equal to or more than 7016 is necessary.

When an attachment error of the CCD line sensor 9, a position deviation of the place where the original org is set and the like are considered, the number of pixels need to be 7016+α. Therefore, the number of pixels in the black photodiode array 9K1 is set at 7500 in this example. In this case, the number of pixels in the green photodiode array 9G1, the blue photodiode array 9B1 and the black photodiode array 9K1 is 3750 pixels (half of 7500 pixels).

Next, the flow of processing, from conversion of the analog signal outputted from the CCD line sensor to a digital signal up to image processing such as distortion correction (hereinafter referred to as shading correction) and inter-line correction, will be described.

Figure 6:
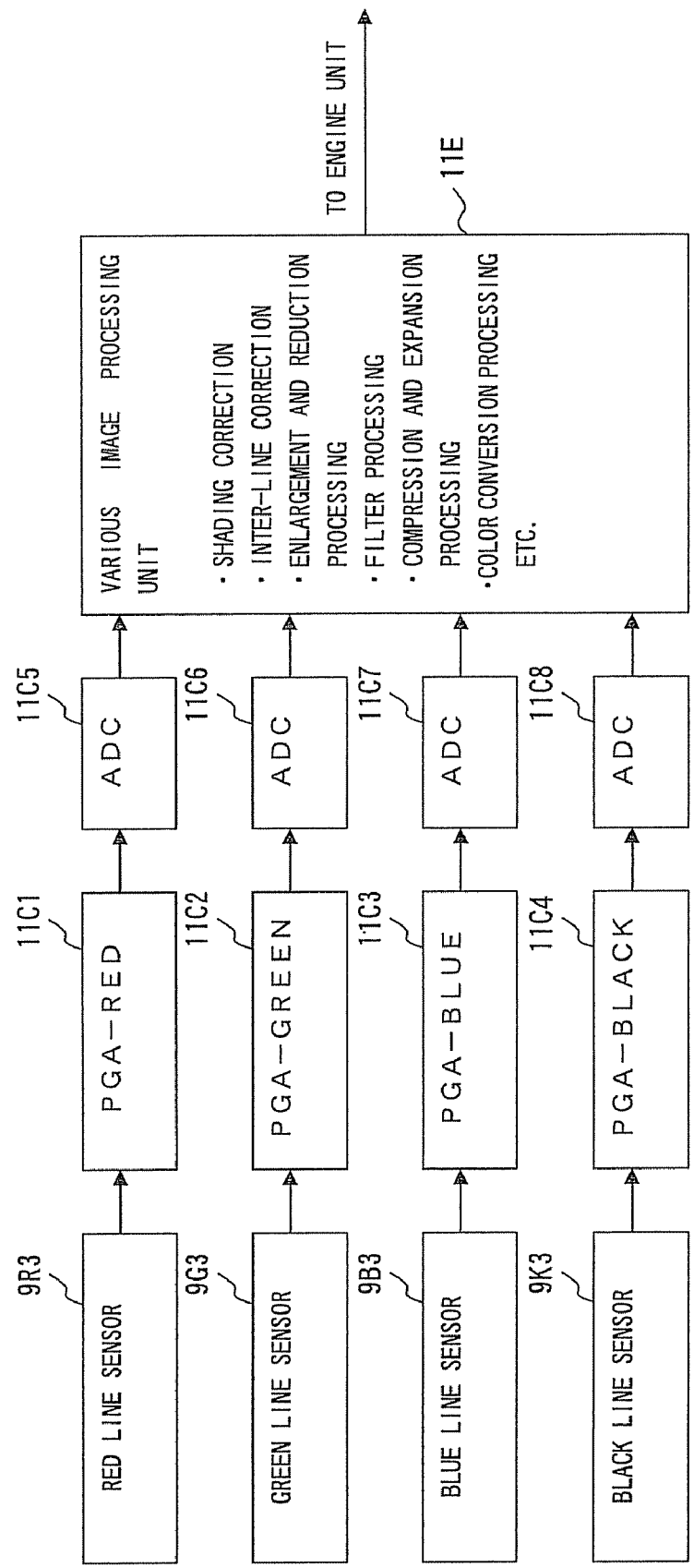
FIG. 6 is a view for explaining a flow of processing in the image reading apparatus according to the embodiment.

FIG. 6 is a view for explaining the flow of processing in the image reading apparatus according to the embodiment.

For the analog output signal OUT1 from the red line sensor shown in FIG. 3, the DC signal component included in the output signal from the CCD line sensor is removed by a coupling capacitor arranged in series, not shown. After that, the analog signal component is stabilized by a sample hold circuit, not shown. The amplitude of the analog signal thus stabilized is adjusted by a gain amplifier circuit (PGA-RED in FIG. 6) 11C1 in which an amplification factor can be set by an external signal. Then, the analog signal is converted to a digital signal by a downstream A/D converter (ADC in FIG. 6) 11C5 that converts an analog signal to a digital signal. The image signal converted to the digital signal is sent to the downstream various image processing unit 11E. PGA will be later described in detail.

Similarly, for the analog output signal OUT2 from the green line sensor, the DC signal component included in the output signal from the CCD line sensor is removed by a coupling capacitor arranged in series, not shown. After that, the analog signal component is stabilized by a sample hold circuit, not shown. The amplitude of the analog signal thus stabilized is adjusted by a gain amplifier circuit (PGA-GREEN in FIG. 6) 11C2 in which an amplification factor can be set by an external signal. Then, the analog signal is converted to a digital signal by a downstream A/D converter (ADC in FIG. 6) 11C6 that converts an analog signal to a digital signal. The image signal converted to the digital signal is sent to the downstream various image processing unit 11E.

Similarly, for the analog output signal OUT3 from the blue line sensor, the DC signal component included in the output signal from the CCD line sensor is removed by a coupling capacitor arranged in series, not shown. After that, the analog signal component is stabilized by a sample hold circuit, not shown. The amplitude of the analog signal thus stabilized is adjusted by a gain amplifier circuit (PGA-BLUE in FIG. 6) 11C3 in which an amplification factor can be set by an external signal. Then, the analog signal is converted to a digital signal by a downstream A/D converter (ADC in FIG. 6) 11C7 that converts an analog signal to a digital signal. The image signal converted to the digital signal is sent to the downstream various image processing unit 11E.

Similarly, for the analog output signal OUT4 from the black line sensor, the DC signal component included in the output signal from the CCD line sensor is removed by a coupling capacitor arranged in series, not shown. After that, the analog signal component is stabilized by a sample hold circuit, not shown. The amplitude of the analog signal thus stabilized is adjusted by a gain amplifier circuit (PGA-BLACK in FIG. 6) 11C4 in which an amplification factor can be set by an external signal. Then, the analog signal is converted to a digital signal by a downstream A/D converter (ADC in FIG. 6) 11C8 that converts an analog signal to a digital signal. The image signal converted to the digital signal is sent to the downstream various image processing unit 11E.

The image processing unit 11E performs shading correction, inter-line correction, processing to correct the red, green and blue output signals by using the black output signal, and the like. The processed signals are sent to an engine unit.

Figure 7:
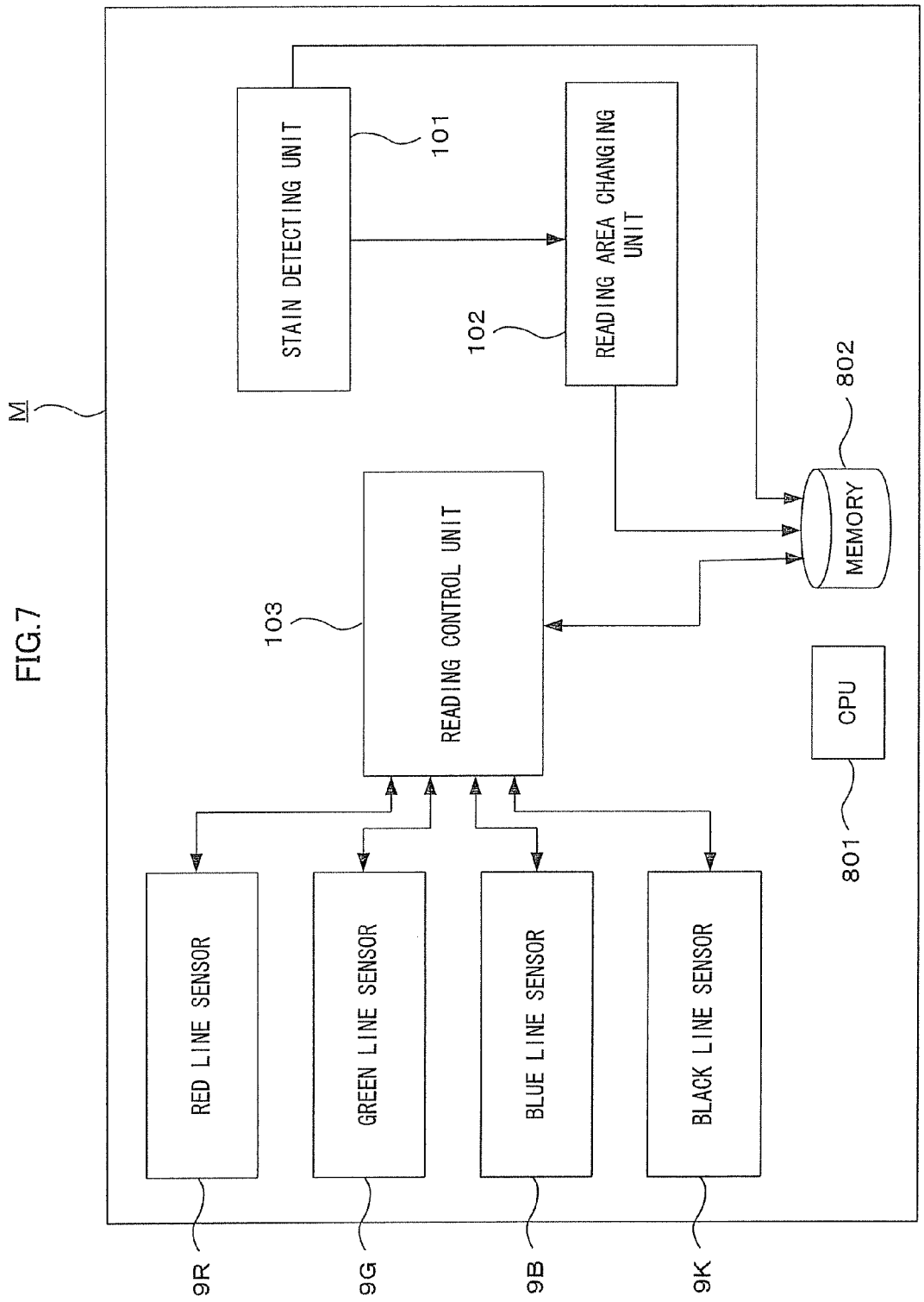
FIG. 7 is a functional block diagram for explaining the image reading apparatus M according to the embodiment.

FIG. 7 is a functional block diagram for explaining the image reading apparatus M according to the embodiment. The image reading apparatus M according to the embodiment has plural line sensors (equivalent to the red line sensor 9R, the green line sensor 9G, the blue line sensor 9B and the black line sensor 9K), a stain detecting unit 101, a reading area changing unit 102, a reading control unit 103, a CPU 801, a memory 802, and a control unit 803.

The plural line sensors are arranged at different positions from each other in the sub-scanning direction H and read reflected light from a reading target surface, guided by the scanning optical system that moves in the sub-scanning direction. These plural line sensors form the CCD line sensor 9.

The reading control unit 103 controls the image reading timing in each line sensor so that, when the plural line sensors read a predetermined white reference board in order to perform shading correction, the plural line sensors have substantially the same reading area on the white reference board.

With such a configuration, when reading white reference data that is necessary for shading correction, the reading range on the white reference board by the plural image reading units (line sensors) can be narrowed. Even when stain or the like is adhering to the vicinity of the white reference board, the probability of reading the stain can be lowered.

Specifically, the reading control unit 103 controls the image reading timing in each line sensor so that the plural line sensors have substantially the same reading area on the white reference board, on the basis of the distance between the plural line sensors in a predetermined direction. In addition, the reading control unit 103 can control the image reading timing in each line sensor so that the plural line sensors have substantially the same reading area on the white reference board, on the basis of the moving speed (scanning speed or reading magnification) of the plural line sensors in a predetermined direction. In this manner, even when the reading range on the white reference board is changed by a change in the moving speed of the line sensors due to a change in the reading magnification, the reading control unit 103 controls the image reading timing in each line sensors so that the plural line sensors have substantially the same reading area on the white reference board, by changing the number of p lines or the reading timing of each line sensor.

In this manner, the image reading timing in each line sensor is controlled so that the reading start timing is more delayed in a line sensor situated further downstream in the moving direction of each line sensor at the time of reading the white reference board, on the basis of the distance between the plural line sensors or the moving speed of the line sensors. Thus, the plural line sensors are enabled to have substantially the same reading area on the white reference board.

The stain detecting unit 101 detects stain in the reading area on the white reference board 12 by using a known stain detecting technique. Specifically, the stain detecting unit 101 finds, for example, a median of plural lines and detects the presence or absence of stain based on the difference from the median. The stain detecting unit 101 detects stain on the predetermined white reference board 12 at such timing as when turning on the power of the image reading apparatus M, when starting the reading operation in the image reading apparatus M, after the lapse of a predetermined time after the processing to change the previous reading area in the image reading apparatus M, and after reading a predetermined number of sheets (determined by a counter value or the like) after the processing to change the previous reading area by the reading area changing unit 102 via the control unit 803.

In the case where stain is detected by the stain detecting unit 101, the reading area changing unit 102 shifts the reading area for the plural line sensors in the sub-scanning direction via the control unit 803, thereby changing to an area that does not include the stain. The change of the reading area will be later described in detail.

In this manner, in the case where stain is detected in the reading area on the white reference board, the reading area is changed to avoid the stain. Thus, the influence of the stain on the data acquired as a result of reading the white reference board at the time of shading correction can be eliminated as much as possible, and it can contribute to improvement in the reading image quality in the image reading apparatus.

The CPU 801 serves to perform various processing in the image reading apparatus, and also serves to realize various functions by executing programs stored in the memory 802 via the control unit 803. The memory 802 is formed by, for example, an HDD, ROM, RAM or the like. It serves to store various kinds of information and programs to be used in the image reading apparatus.

Next, the procedure for performing shading correction according to the embodiment, of image processing carried out by the image processing unit 11E, will be described.

Figure 8:
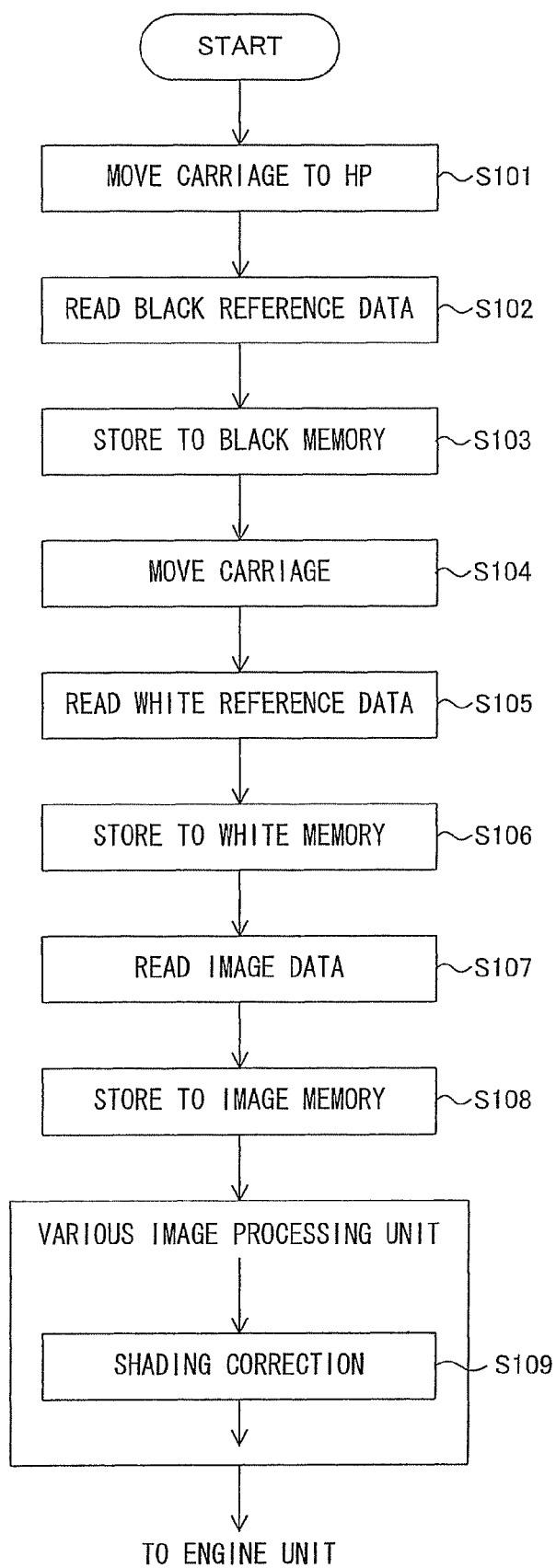
FIG. 8 is a flowchart showing a flow of shading correction processing in the image reading apparatus according to the first embodiment of the invention.

FIG. 8 is a flowchart showing the flow of shading correction processing in the image reading apparatus according to the first embodiment of the invention.

First, the first carriage 4 having the light source is moved to a home position (HP) (S101).

Here, black reference data that is necessary for shading correction is read (S102).

The method for reading black reference data may be, for example, reading with the light source off, or reading a black reference board with the light source on, and the like. Here, the read black reference data is stored into a black memory (for example, the memory 802 or the like) (S103).

Next, the carriage having the light source is moved (S104) and white reference data is read (S105). The method for reading white reference data may be, for example, reading the white reference board with the light source on, and the like.

Here, the read white reference data is stored into a white memory (for example, the memory 802 or the like) (S106).

Next, image data is read (S107). The image data that has been read here is stored into an image memory (for example, the memory 802 or the like) (S108). Using the black reference data, the white reference data and the image data, the image processing unit carries out shading correction (S109).

The image reading apparatus M according to the embodiment is characterized in that the timing of the reading operation is varied between the line sensors at the time of the white reference data reading operation in the flowchart shown in FIG. 8.

Hereinafter, the image reading operation in the embodiment will be described in detail.

Figure 9:
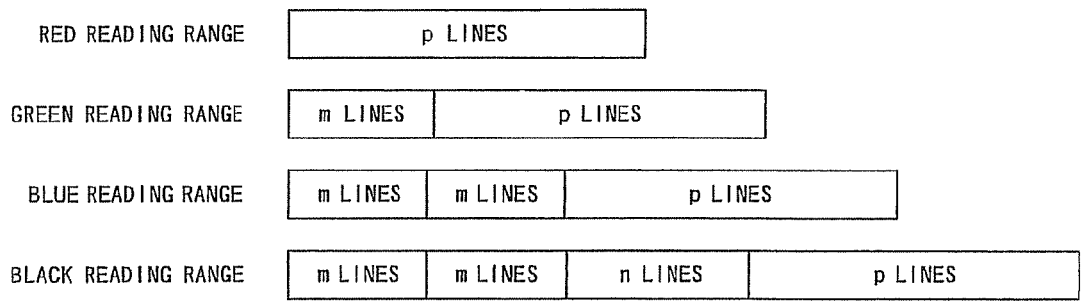
FIG. 9 is a view showing the reading range for each line sensor at the time of shading correction in a traditional image reading apparatus.

FIG. 9 is a view showing the reading range on the white reference board for each line sensor at the time of shading correction by a conventional image reading apparatus. From above, the reading range of the red line sensor (hereinafter R sensor), the reading range of the green line sensor (hereinafter G sensor), the reading range of the blue line sensor (hereinafter B sensor), and the reading range of the black line sensor (hereinafter K sensor) are shown.

Generally, when reading white reference data, plural lines are read and these are averaged to acquire white reference data in order to reduce small stain and reading noise at the reading position. The p lines represent the plural lines.

In FIG. 9, it is shown that when the R sensor reads the white reference data, a width equal to p lines is necessary. It is also shown that when the G sensor reads the white reference data, a line width equal to p lines plus the distance between the R sensor and the G sensor, which is m lines, is necessary because of the line interval between the line sensors shown in FIG. 4. It is also shown that when the B sensor reads the white reference data, a line width equal to p lines plus the distance between the R sensor and G sensor, which is m lines, plus the distance between the G sensor and the B sensor, which is m lines, is necessary because of the line interval between the line sensors shown in FIG. 4. It is also shown that when the K sensor reads the white reference data, a line width equal to p lines plus the distance between the R sensor and G sensor, which is m lines, plus the distance between the G sensor and the B sensor, which is m lines, plus the distance between the B sensor and the K sensor, which is n lines, is necessary because of the line interval between the line sensors shown in FIG. 4. Thus, when reading the white reference data by each of the R, G, B and K sensors, the reading range necessary for the K sensor, which is the longest, must be read.

Figure 10:
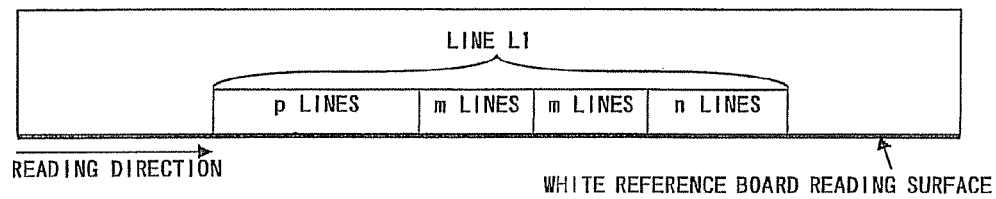
FIG. 10 is a view showing the range in which white reference data is actually read by the traditional reading method shown in FIG. 9, in association with the cross section of the white reference board.

FIG. 10 is a view showing the range in which the white reference board is actually read by the traditional reading method shown in FIG. 9, in association with the cross section of the white reference board. FIG. 10 is a schematic view in the case where the white reference board is read, as viewed from the direction of the image reading apparatus shown in FIG. 1.

When the first carriage 4 moves in the reading direction and carries out readings of the white reference data, the width equal to p lines+m lines+m lines+n lines that is necessary for reading the white reference data is referred to as a line L1. The line L1 has a length that is necessary for satisfactorily reading the white reference data. If there is stain or foreign matter within this reading line L1, satisfactory white reference data cannot be acquired.

Compared to the reading of the white reference board in the traditional shading correction shown in FIG. 9 and FIG. 10, the length of the reading line L1 is reduced in this embodiment, thereby preventing deterioration in the white reference data due to the influence of stain or foreign matter and simplifying the adjustment of the white reference reading position.

Figure 11:
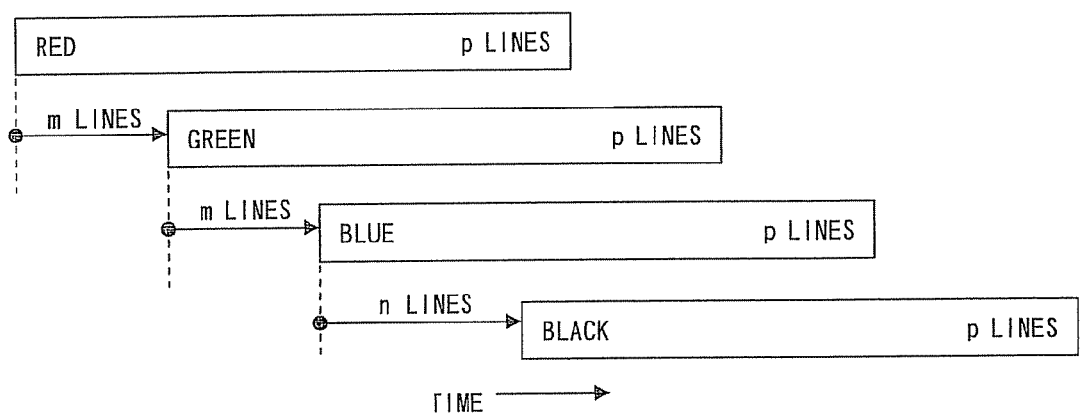
FIG. 11 is a view showing the reading range and the reading timing for each line sensor in the image reading apparatus according to the first embodiment of the invention.

FIG. 11 is a view showing the reading range and the reading timing for each line sensor in the image reading apparatus according to the embodiment. From above, the reading range and the reading timing of the R sensor, the reading range and the reading timing of the G sensor, the reading range and the reading timing of the B sensor, and the reading range and the reading timing of the K sensor are shown. Here, the p lines shown in FIG. 11 are assumed to be the same length with the p lines in FIG. 9.

In the image reading apparatus according to the embodiment, first, reading of the white reference by the R sensor is started. Next, the reading timing is delayed in accordance with the reading speed (the moving speed of the first carriage in the H direction), and after the lapse of the reading time for m lines, reading by the G sensor is started. Next, the reading timing is delayed in accordance with the reading speed, and after the lapse of the reading time for m lines, reading by the B sensor is started. Next, the reading timing is delayed in accordance with the reading speed, and after the lapse of the reading time for n lines, reading by the K sensor is started. In the case where the white reference is read by each line sensor at such timing, the line width necessary for satisfactory reading of the white reference data is p lines.

Figure 12:
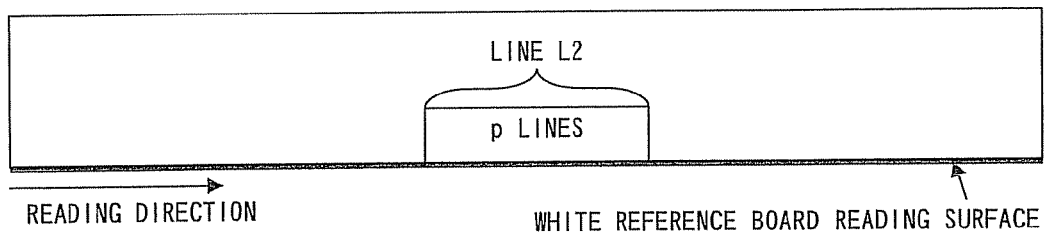
FIG. 12 is a view showing the range in which white reference data is actually read by the reading method shown in FIG. 11, in association with the cross section of the white reference board.

FIG. 12 is a view showing the range in which the white reference data is actually read by the reading method shown in FIG. 11, in association with the cross section of the white reference board. FIG. 12 is a schematic view in the case where the white reference board is read, as viewed from the direction of the image reading apparatus shown in FIG. 1. The first carriage moves in the reading direction and carries out reading of the white reference data. Here, the width equal to p lines necessary for reading the white reference data is referred to as a line L2.

If the length of the line L1 shown in FIG. 10 and the length of the line L2 shown in FIG. 12 are compared with each other, it can be seen that the line L2 is shorter than the line L1 by m lines+m lines+n lines. That is, the range in which the white reference board is read by each sensor at the time of shading correction is narrower, and even when stain is adhering to the white reference board, the probability of reading the stain can be restrained to the minimum and the white reference data can be read satisfactorily.

Next, the effects of the image reading apparatus according to the embodiment will be described, compared with the configuration of the traditional image reading apparatus.

Figure 13:
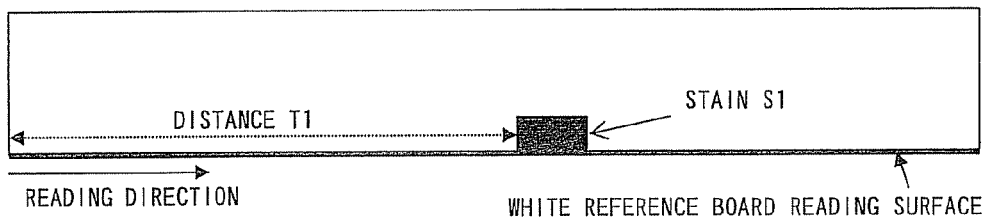
FIG. 13 is a view showing a white reference board reading cross section in the case where stain is adhering at one position on the white reference board.
Figure 14:
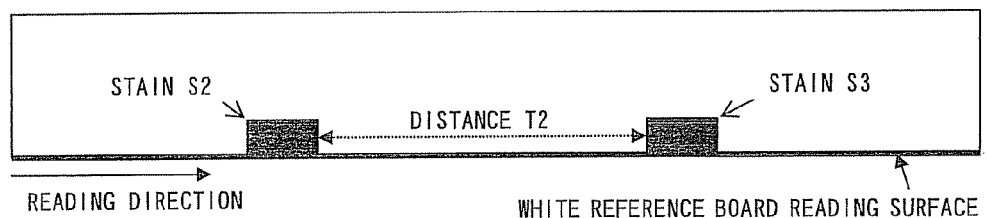
FIG. 14 is a view showing a white reference board reading cross section in the case where stain is adhering at two positions on the white reference board.

FIG. 13 is a view showing a white reference board reading cross section in the case where stain is adhering at one position on the white reference board. FIG. 14 is a view showing a white reference board reading cross section in the case where stain is adhering at two positions on the white reference board.

FIG. 13 and FIG. 14 are schematic views in the case where the white reference board is read, as viewed from the direction of the image reading apparatus shown in FIG. 1. Stains S1, S2 and S3 shown in FIG. 13 and FIG. 14 are assumed to be stains that largely affect the reading of the white reference data. It is assumed that satisfactory white reference data cannot be acquired if the range of the stains S1, S2 and S3 is read.

A distance T1 is the maximum distance of the area in which white reference data without having stain can be acquired, on the white reference board shown in FIG. 13. A distance T2 is the maximum distance of the area in which white reference data without having stain can be acquired, on the white reference board shown in FIG. 14.

In the case of acquiring satisfactory white reference data by using these white reference boards, the distance T1 from the leading end of the white reference board reading range to the stain S1 in FIG. 13 and the distance T2 from the stain S2 to the stain S3 in FIG. 14 must be longer than the white reference reading range shown in FIG. 10 and FIG. 12. This is because if the white reference reading range is longer than T1 and T2, the white reference reading range necessarily overlaps with the stains.

Figure 15:
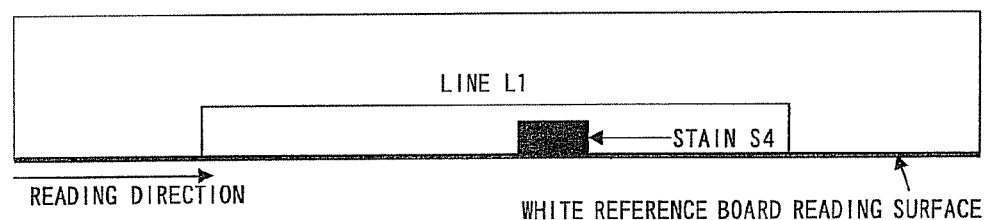
FIG. 15 is a view showing the case where the white reference board shown in FIG. 13 is read by line L1 of the reading range according to the traditional method.
Figure 16:
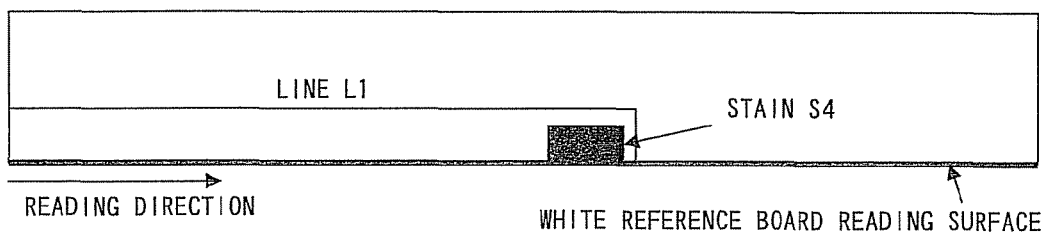
FIG. 16 is a view showing the state where the reading range is shifted in order to acquire good white reference data.

FIG. 15 is a view showing the case where the white reference board shown in FIG. 13 is read by the reading range line L1 in the traditional image reading apparatus. In FIG. 15, the reading range overlaps with a stain S4 and satisfactory white reference data cannot be acquired. FIG. 16 is a view showing the state where the reading range is shifted in order to acquire satisfactory white reference data. However, in the traditional image reading apparatus, since the length of the reading range line L1 is too long, satisfactory white reference data cannot be read even when the reading range line L1 is shifted to the farthest position from the stain S4 in order to read satisfactory white reference data.

Figure 17:
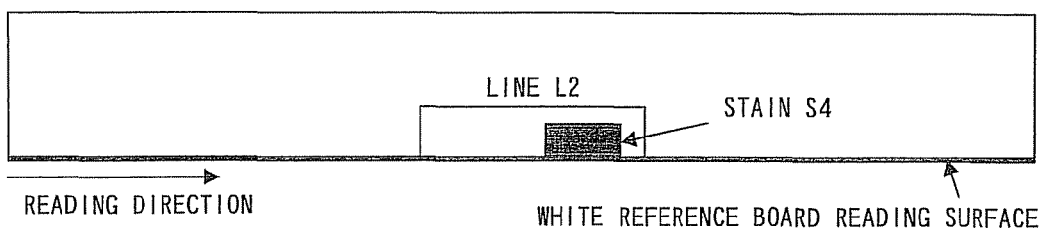
FIG. 17 is a view showing the case where the white reference board shown in FIG. 13 is read by line L2 of the reading range according to the embodiment.
Figure 18:
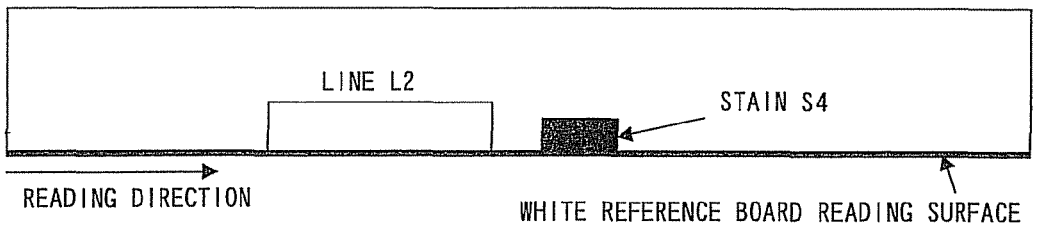
FIG. 18 is a view showing the state where the reading range is shifted in order to acquire good white reference data.

FIG. 17 is a view showing the case where the white reference board shown in FIG. 13 is read by the reading range line L2 according to the embodiment. In FIG. 17, the reading range overlaps with the stain S4 and satisfactory white reference data cannot be acquired. FIG. 18 is a view showing the state where the reading range is shifted in order to acquire satisfactory white reference data. By using the method for reading white reference data according to this embodiment, it is possible to reduce the length of the reading range line L2, compared with the traditional image reading apparatus. As the reading range line L2 is shifted to the farthest position from the stain S4 in order to read satisfactory white reference data, the satisfactory white reference data can be read.

In this manner, in this embodiment, the adjustment of the white reference board reading position can be simplified by reducing the reading range on the white reference board, and also the reading position on the white reference board can be automatically adjusted by detecting the stain adhering to the white reference board.

Hereinafter, the method for adjusting the reading position on the white reference board according to the embodiment will be described.

Figure 19:
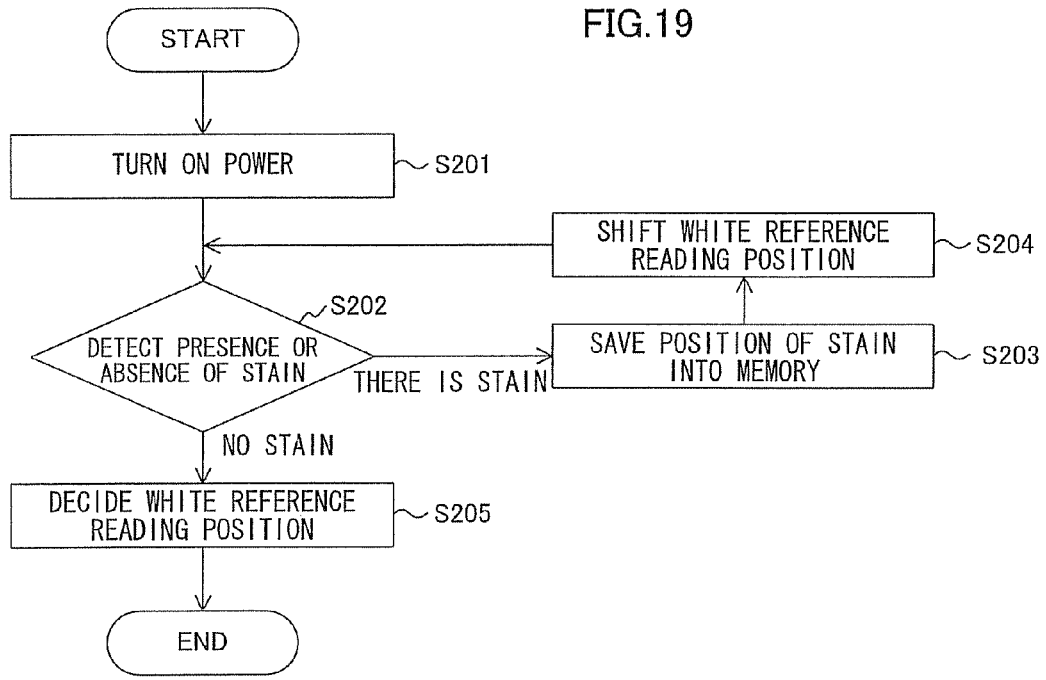
FIG. 19 is a flowchart for explaining the processing to adjust the reading position on the white reference board according to the embodiment.

FIG. 19 is a flowchart for explaining the processing to adjust the reading position on the white reference board according to the embodiment.

First, the power of the image reading apparatus M is turned on (S201). Immediately after the power is turned on, detection of stains on the white reference board is carried out by the stain detecting unit 101 (S202). If there is no stain, the conventional white reference reading position is used (S205) and the automatic adjustment of the white reference reading position is complete. If there is a stain, the position of the stain is saved into, for example, the memory 802 (S203), and the white reference reading position is shifted by the reading area changing unit 102 (S204).

Next, at the shifted position, the presence or absence of a stain is detected again. This is repeated until the white reference reading position is shifted to a place where there is no stain. Thus, it is possible to automatically adjust the white reference reading position to a position where satisfactory white reference data can be acquired. Also, as the positions of the stains are saved in the memory, the distance between the stains and the length of the white reference reading range can be calculated and the white reference position can be automatically shifted to a satisfactory position.

In this manner, according to this embodiment, it is possible to reduce the white reference data reading range. It contributes to simplification of the processing to adjust the white reference data reading position and can restrain deterioration of the white reference reading data due to the stains on the white reference board.

Second Embodiment

Hereinafter, a second embodiment of the invention will be described.

This embodiment is a modification of the first embodiment. The basic configuration of the apparatus is similar to that of the first embodiment and therefore will not be described further in detail.

Figure 20:
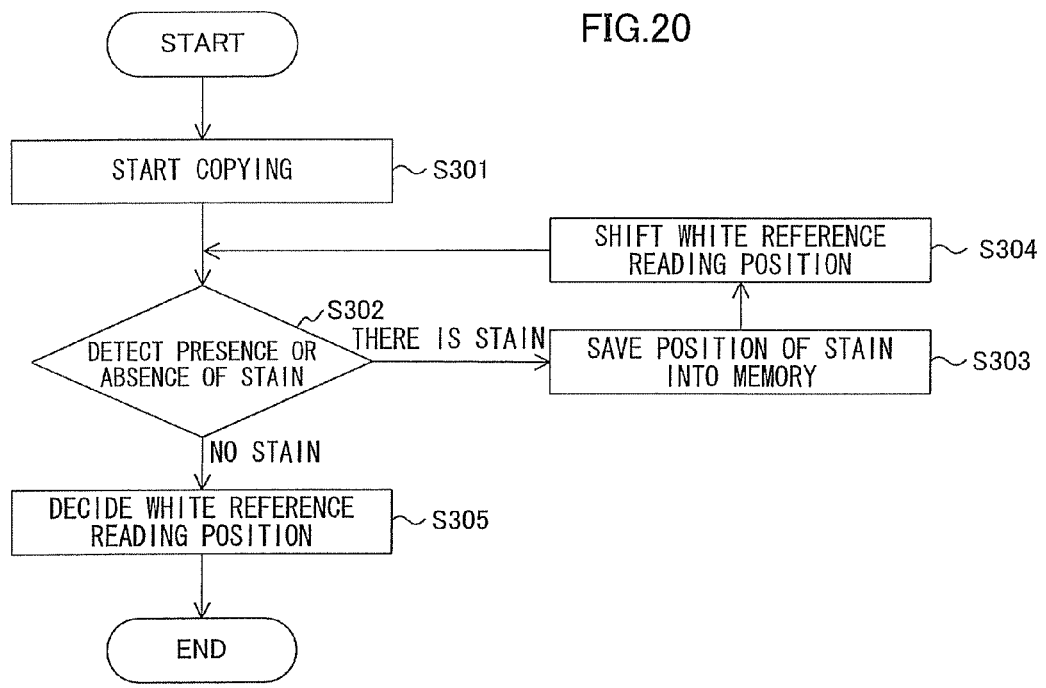
FIG. 20 is a flowchart for explaining the processing to adjust the reading position on the white reference board according to a second embodiment of the invention.

FIG. 20 is a flowchart for explaining the processing to adjust the reading position on the white reference board in the second embodiment of the invention.

At the start of the reading operation, and at the same time as pressing the start button of the image reading apparatus M (S301), detection of stain on the white reference board is carried out (S302). If there is no stain, the conventional white reference reading position is used (S305) and the automatic adjustment of the white reference reading position is completed. If there is a stain, the position of the stain is saved into, for example, the memory 802 (S303) and the white reference reading position is shifted by the reading area changing unit 102 (S304).

Next, at the shifted position, the presence or absence of stain is detected again. This is repeated until the white reference reading position is shifted to a place where there is no stain. Thus, it is possible to automatically adjust the white reference reading position to a position where satisfactory white reference data can be acquired. Also, since the positions of stains are saved into the memory, the distance between the stains and the length of the white reference reading range can be calculated and the white reference position can be automatically shifted to a satisfactory position.

Third Embodiment

Hereinafter, a third embodiment of the invention will be described.

This embodiment is a modification of the first embodiment. The basic configuration of the apparatus is similar to that of the first embodiment and therefore will not be described further in detail.

Figure 21:
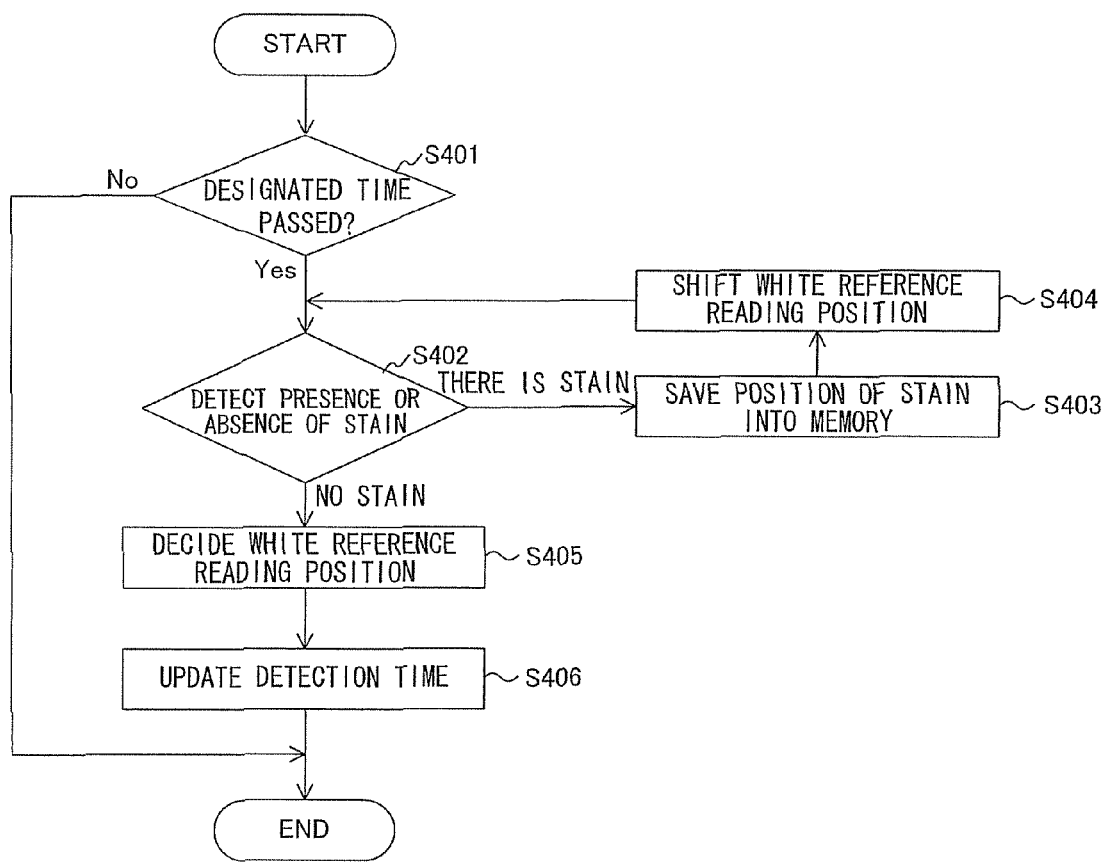
FIG. 21 is a flowchart for explaining the processing to adjust the reading position on the white reference board according to a third embodiment of the invention.

FIG. 21 is a flowchart for explaining the processing to adjust the reading position on the white reference board in the third embodiment of the invention.

Predetermined stain detection timing (detection time) is set at the time of initial adjustment of the image reading apparatus M. When the detection time is reached (S401, Yes), stain detection is started (S402). If no stain is found as a result of the stain detection processing, the conventional white reference reading position is used (S405) and the next automatic white reference reading position adjustment time is updated (S406). The automatic adjustment of the white reference reading position is then completed. If there is a stain, the position of the stain is saved into, for example, the memory 802 (S403) and the white reference reading position is shifted by the reading area changing unit 102 (S404).

Next, at the shifted position, the presence or absence of stain is detected again. This is repeated until the white reference reading position is shifted to a place where there is no stain. Thus, it is possible to detect a stain on the white reference board when there is a high possibility that a stain is adhering to the white reference board, and to automatically adjust the white reference reading position to a position where satisfactory white reference data can be acquired. Also, since the positions of stains are saved into the memory, the distance between the stains and the length of the white reference reading range can be calculated and the white reference position can be automatically shifted to a satisfactory position.

Fourth Embodiment

Hereinafter, a fourth embodiment of the invention will be described.

This embodiment is a modification of the first embodiment. The basic configuration of the apparatus is similar to that of the first embodiment and therefore will not be described further in detail.

Figure 22:
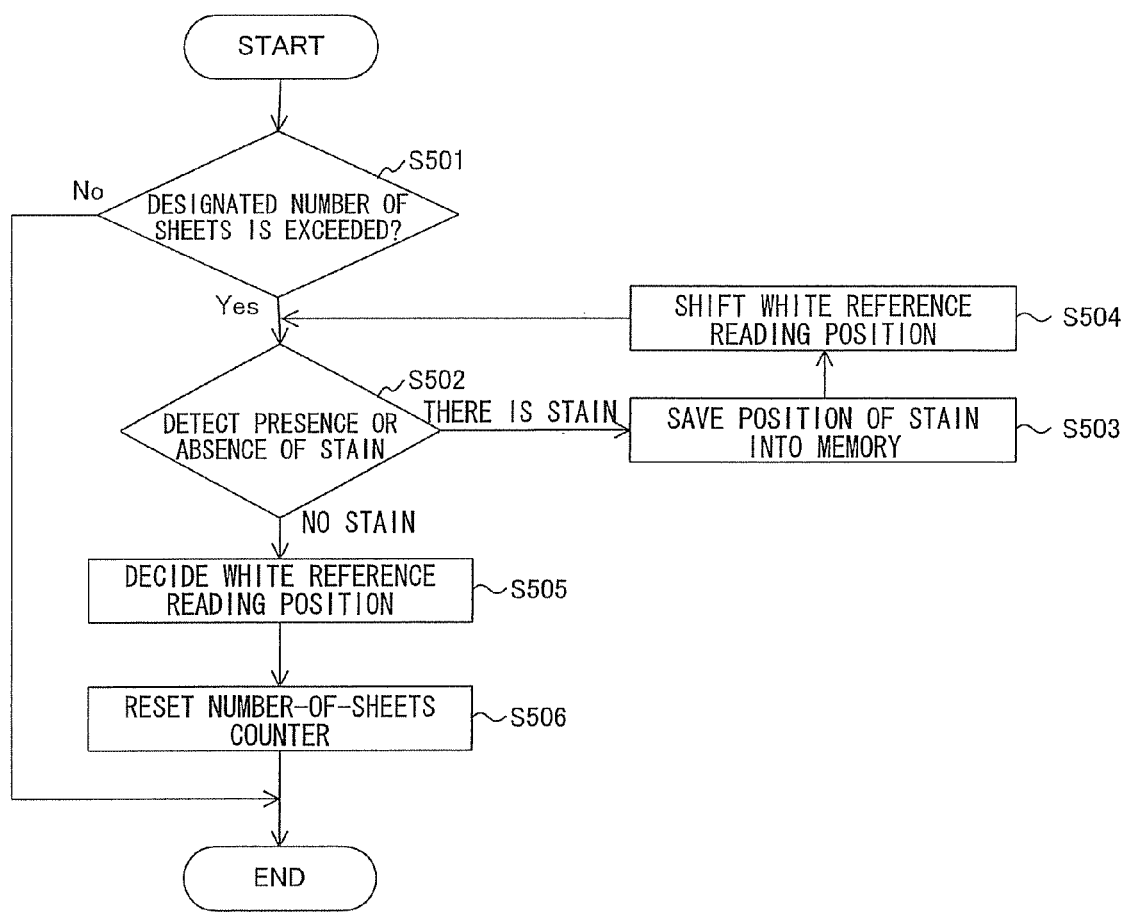
FIG. 22 is a flowchart for explaining the processing to adjust the reading position on the white reference board according to a fourth embodiment of the invention.

FIG. 22 is a flowchart for explaining the processing to adjust the reading position on the white reference board in the fourth embodiment of the invention.

The number of times of the image reading operation before carrying out stain detection is set at the time of initial adjustment of the image reading apparatus M. When the number of detected sheets is reached after the previous change of the reading area (S501, Yes), stain detection is started (S502). If no stain is found as a result of the stain detection processing, the conventional white reference reading position is used (S505) and the number-of-sheets counter is reset (S506). The automatic adjustment of the white reference reading position is then completed. On the other hand, if there is a stain, the position of the stain is saved into, for example, the memory 802 (S503) and the white reference reading position is shifted by the reading area changing unit 102 (S504).

Next, at the shifted position, the presence or absence of stain is detected again. This is repeated until the white reference reading position is shifted to a place where there is no stain. Thus, it is possible to detect a stain on the white reference board when there is a high possibility that a stain is adhering to the white reference board, and to automatically adjust the white reference reading position to a position where satisfactory white reference data can be acquired. Also, since the positions of stains are saved into the memory, the distance between the stains and the length of the white reference reading range can be calculated and the white reference position can be automatically shifted to a satisfactory position.

Figure 23:
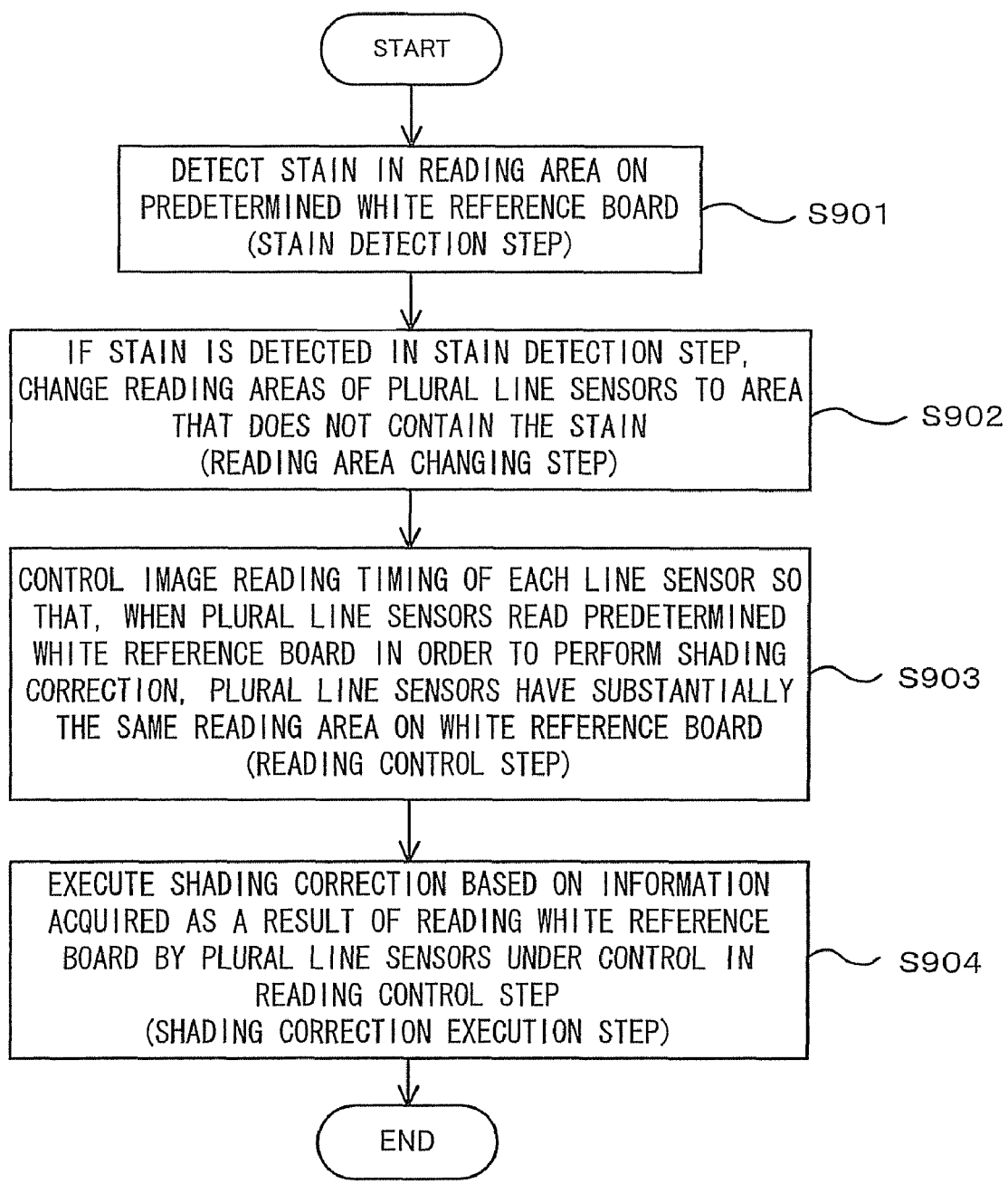
FIG. 23 is a flowchart for explaining an approximate flow of the processing (image density correction method) in the image reading apparatus according to each of the above embodiments.

FIG. 23 is a flowchart for explaining an approximate flow of the processing (image density correction method) in the image reading apparatus according to each of the above embodiments.

The stain detecting unit 101 detects a stain in the reading area on the predetermined white reference board 12 (stain detection step) (S901).

Specifically, in the stain detection step, a stain on the predetermined white reference board 12 is detected at timing (timing when there is a high possibility that a stain is adhering to the white reference board) such as when the power of the image reading apparatus is started, when the reading operation in the image reading apparatus is started, after the lapse of a predetermined time after a change of the reading area in the previous reading area changing step, or after a predetermined number of sheets is read after a change of the reading area in the previous reading area changing step).

If a stain is detected in the stain detection step, the reading area changing unit 102 changes the reading areas of the plural line sensors to an area that does not contain the stain (reading area changing step) (S902).

The reading control unit 103 controls the image reading timing of each line sensor so that, when the plural line sensors read the predetermined white reference board 12 in order to perform shading correction, the plural line sensors have substantially the same reading area on the white reference board 12 (reading control step) (S903).

Specifically, in the reading control step, the image reading timing of each line sensor controlled so that the plural line sensors have substantially the same reading area on the white reference board 12, on the basis of the distance between the plural line sensors in a predetermined direction.

Alternatively, in the reading control step, the image reading timing of each line sensor controlled so that the plural line sensors have substantially the same reading area on the white reference board 12, on the basis of the moving speed of the plural line sensors in a predetermined direction.

The image processing circuit unit 11E performs shading correction based on information acquired as a result of reading the white reference board 12 by the plural sensors, in accordance with the control in the reading control step (shading correction execution step) (S904).

Each step in the processing in the image reading apparatus is realized by causing the CPU 801 to execute an image density correction program stored in the memory 802.

In each of the above embodiments, the image reading apparatus of the configuration in which the light guided by the scanning optical system that moves in the sub-scanning direction is received by the line sensors that are fixedly arranged, is described as an example. However, the invention is not limited to this. For example, the invention can also be applied to an image reading apparatus of a configuration in which plural line sensors are integrally moved in the sub-scanning direction (H direction that is in the horizontal direction in FIG. 1) to read an original image.

That is, the image reading apparatus according to the invention can include plural line sensors arranged at different positions from each other in a predetermined direction and configured to integrally move in the predetermined direction and thus read an image on a reading target, and a reading control unit configured to control image reading timing of each line sensor so that, when the plural line sensors read a predetermined white reference board in order to perform shading correction, the plural line sensors have substantially the same reading area on the white reference board.

In the embodiments, the case where the functions to carry out the invention have already been recorded within the apparatus, is described. However, the functions are not limited to this form. The similar functions may be downloaded to the apparatus from a network, or the similar functions stored on a recording medium may be installed into the apparatus. As the recording medium, any form of medium may be employed as long as it can store programs like CD-ROM and can be read by the apparatus. Also, the functions thus acquired in advance by installing or downloading may be realized in cooperation with the operating system (OS) in the apparatus.

As described above, according to the embodiments, an image reading apparatus can be provided that can reduce the reading range on the white reference board, compared with the traditional technique, and that can acquire satisfactory white reference data. Also, in the image reading apparatus according to the embodiments, automatic adjustment of the white reference reading position that enables acquisition of satisfactory white reference data can be carried out by using the stain detection technique.

The invention has been described in detail by using specific embodiments, but it is obvious to those skilled in the art that various changes and modifications can be made without departing from the spirit and scope of the invention.

As described above in detail, according to the invention, a technique that can realize acquisition of a proper white reference value in shading correction can be provided.

What is claimed is:

1. An image reading apparatus comprising:
   plural line sensors arranged at different positions from each other in a sub-scanning direction and configured to read reflected light from a reading target surface, guided by a scanning optical system that moves in the sub-scanning direction;
   a reading control unit configured to control image reading timing in each line sensor so that, when reading a predetermined white reference board by the plural line sensors in order to perform shading correction, the plural line sensors have substantially the same reading area on the white reference board;
   a stain detecting unit configured to detect a stain in a reading area on the predetermined white reference board; and
   a reading area changing unit configured to, when a stain is detected by the stain detecting unit, change the reading areas of the plural line sensors to an area that does not contain the stain.

2. The image reading apparatus according to claim 1, wherein the reading control unit controls the image reading timing in each line sensor so that the plural line sensors have substantially the same reading area on the white reference board, on the basis of a distance between the plural line sensors in the predetermined direction.

3. The image reading apparatus according to claim 1, wherein the reading control unit controls the image reading timing in each line sensor so that the plural line sensors have substantially the same reading area on the white reference board, on the basis of a moving speed of the plural line sensors in the predetermined direction.

4. The image reading apparatus according to claim 1, wherein the stain detecting unit detects a stain on the predetermined white reference board when power of the image reading apparatus is turned on.

5. The image reading apparatus according to claim 1, wherein the stain detecting unit detects a stain on the predetermined white reference board when a reading operation in the image reading apparatus is started.

6. The image reading apparatus according to claim 1, wherein the stain detecting unit detects a stain on the predetermined white reference board after the lapse of a predetermined time after previous change of the reading area by the reading area changing unit.

7. The image reading apparatus according to claim 1, wherein the stain detecting unit detects a stain on the predetermined white reference board when a predetermined number of sheets is read after previous change of the reading area by the reading area changing unit.

8. An image reading apparatus comprising:
   plural image reading means arranged at different positions from each other in a sub-scanning direction and for reading reflected light from a reading target surface, guided by a scanning optical system that moves in the sub-scanning direction;
   reading control means for controlling image reading timing in each image reading means so that, when reading a predetermined white reference board by the plural image reading means in order to perform shading correction, the plural image reading means have substantially the same reading area on the white reference board;
   stain detecting means for detecting a stain in a reading area on the predetermined white reference board; and
   reading area changing means for, when a stain is detected by the stain detecting means, changing the reading areas of the plural image reading means to an area that does not contain the stain.

9. The image reading apparatus according to claim 8, wherein the reading control means controls the image reading timing in each image reading means so that the plural image reading means have substantially the same reading area on the white reference board, on the basis of a distance between the plural image reading means in the predetermined direction.

10. The image reading apparatus according to claim 8, wherein the reading control means controls the image reading timing in each image reading means so that the plural image reading means have substantially the same reading area on the white reference board, on the basis of a moving speed of the plural image reading means in the predetermined direction.

11. An image density correction method for an image reading apparatus that has plural line sensors arranged at different positions from each other in a sub-scanning direction and configured to read reflected light from a reading target surface, guided by a scanning optical system that moves in the sub-scanning direction, the method comprising the steps of:
   controlling image reading timing in each line sensor so that, when reading a predetermined white reference board by the plural line sensors in order to perform shading correction, the plural line sensors have substantially the same reading area on the white reference board;
   executing shading correction based on information acquired as a result of reading the white reference board by the plural line sensors, in accordance with the control of reading;
   detecting a stain in a reading area on the predetermined white reference board; and
   when a stain is detected in the step of detecting, changing the reading areas of the plural line sensors to an area that does not contain the stain.

12. The image density correction method according to claim 11, wherein in the step of controlling the reading, the image reading timing in each line sensor is controlled so that the plural line sensors have substantially the same reading area on the white reference board, on the basis of a distance between the plural line sensors in the predetermined direction.

13. The image density correction method according to claim 11, wherein in the step of controlling the reading, the image reading timing in each line sensor is controlled so that the plural line sensors have substantially the same reading area on the white reference board, on the basis of a moving speed of the plural line sensors in the predetermined direction.

14. The image density correction method according to claim 11, wherein in the step of detecting, a stain on the predetermined white reference board is detected when power of the image reading apparatus is turned on.

15. The image density correction method according to claim 11, wherein in the step of detecting, a stain on the predetermined white reference board is detected when a reading operation in the image reading apparatus is started.

16. The image density correction method according to claim 11, wherein in the step of detecting, a stain on the predetermined white reference board is detected after the lapse of a predetermined time after previous change of the reading area in the step of changing the reading area.

17. The image density correction method according to claim 11, wherein in the step of detecting, a stain on the predetermined white reference board is detected after a predetermined number of sheets is read after previous change of the reading area in the step of changing the reading area.

* * * * *